(12) United States Patent
Whitfield, Jr. et al.

(10) Patent No.: US 11,892,836 B2
(45) Date of Patent: Feb. 6, 2024

(54) SYSTEM FOR CONTROLLING A PLURALITY OF AUTONOMOUS VEHICLES ON A MINE SITE

(71) Applicant: LIEBHERR MINING EQUIPMENT NEWPORT NEWS CO., Newport News, VA (US)

(72) Inventors: James Whitfield, Jr., Newport News, VA (US); Bryan Harper, Newport News, VA (US)

(73) Assignee: LIEBHERR MINING EQUIPMENT NEWPORT NEWS CO., Newport News, VA (US)

( * ) Notice: Subject to any disclaimer, the term of this patent is extended or adjusted under 35 U.S.C. 154(b) by 140 days.

(21) Appl. No.: 16/773,790

(22) Filed: Jan. 27, 2020

(65) Prior Publication Data
US 2021/0232137 A1    Jul. 29, 2021

(51) Int. Cl.
*G05D 1/00* (2006.01)
*B60W 60/00* (2020.01)
(Continued)

(52) U.S. Cl.
CPC ......... *G05D 1/0027* (2013.01); *B60W 60/007* (2020.02); *E21F 17/00* (2013.01);
(Continued)

(58) Field of Classification Search
CPC .......... G05D 1/00; G05D 1/02; G05D 1/0011; G05D 1/0022; G05D 1/0088; G05D 1/021;
(Continued)

(56) References Cited

U.S. PATENT DOCUMENTS

| 5,448,479 A | 9/1995 | Kemner et al. |
| 2003/0102974 A1 | 6/2003 | Allen |

(Continued)

FOREIGN PATENT DOCUMENTS

| EP | 2476034 B1 | 6/2016 | |
| SE | 1350333 A1 * | 3/2013 | ............... G05D 1/00 |

(Continued)

OTHER PUBLICATIONS

European Patent Office, Extended European Search Report Issued in Application No. 21153764.2, dated May 3, 2021. Germany, 12 pages.
(Continued)

*Primary Examiner* — Kenneth J Malkowski
*Assistant Examiner* — Carville Albert Hollingsworth, IV
(74) *Attorney, Agent, or Firm* — McCoy Russell LLP

(57) ABSTRACT

The present application comprises a system for controlling a plurality of autonomous vehicles on a mine site, the system comprising: a centralized platform configured to store an inventory list of vehicles travelling on the mine site and comprising a first communication interface configured to communicate missions to the vehicles; a plurality of autonomous vehicles, the autonomous vehicles comprising: a first communication interface configured to wirelessly communicate with the centralized platform for receiving a predetermined mission, a trajectory control system configured to autonomously control the autonomous vehicle according to the predetermined mission; and at least one portable device, the portable device comprising a second communication interface configured to wirelessly communicate with a second communication interface of the plurality of vehicles from the mine site.

20 Claims, 7 Drawing Sheets

(51) Int. Cl.
*E21F 17/00* (2006.01)
*G05D 1/02* (2020.01)

(52) U.S. Cl.
CPC ......... *G05D 1/0016* (2013.01); *G05D 1/0276* (2013.01); *G05D 1/0287* (2013.01); *B60W 2556/45* (2020.02); *G05D 2201/021* (2013.01)

(58) Field of Classification Search
CPC ......... G05D 1/0278; G05D 2201/0202; G05D 2201/021; G05D 1/0027; G05D 1/0016; G05D 1/0276; G05D 1/0287; B60W 60/007; B60W 2556/45; E21F 17/00
See application file for complete search history.

(56) References Cited

U.S. PATENT DOCUMENTS

| | | | | |
|---|---|---|---|---|
| 2012/0136507 | A1* | 5/2012 | Everett | G05D 1/0297 701/2 |
| 2013/0132246 | A1* | 5/2013 | Amin | G06Q 10/02 705/34 |
| 2014/0372020 | A1* | 12/2014 | Stein | G01C 21/3602 701/410 |
| 2015/0308270 | A1 | 10/2015 | Wilmot et al. | |
| 2016/0224029 | A1 | 8/2016 | Tojima et al. | |
| 2017/0270761 | A1 | 9/2017 | Jones | |
| 2018/0291575 | A1 | 10/2018 | Roe, Jr. et al. | |
| 2018/0349953 | A1* | 12/2018 | Tian | G06Q 30/0255 |
| 2021/0197762 | A1* | 7/2021 | Abiakle Kai | B60W 50/12 |

FOREIGN PATENT DOCUMENTS

| | | | |
|---|---|---|---|
| WO | 2011026652 A2 | 3/2011 | |
| WO | 2011026652 A3 | 3/2011 | |
| WO | 2015037442 A1 | 3/2015 | |
| WO | 2015187081 A1 | 12/2015 | |
| WO | WO-2015187081 A1 * | 12/2015 | ............. E02F 9/205 |
| WO | 2016047208 A1 | 3/2016 | |
| WO | 2017184068 A1 | 10/2017 | |
| WO | WO-2019023324 A1 * | 1/2019 | ............. G07C 5/008 |

OTHER PUBLICATIONS

1 European Patent Office, Office Action Issued in Application No. 21153764.2, dated Feb. 9, 2022, Germany, 12 pages.
1 European Patent Office, Office Action Issued in Application No. 21153764.2, dated Jul. 1, 2022, Germany, 8 pages.

* cited by examiner

SYSTEM FOR CONTROLLING A PLURALITY OF AUTONOMOUS VEHICLES ON A MINE SITE

TECHNICAL FIELD

The present disclosure relates to a system for controlling a plurality of autonomous vehicles on a mine site.

BACKGROUND

Autonomously controlled vehicles used on a mine site, such as autonomously controlled dumper trucks, may receive a mission from a centralized platform comprising a predefined trajectory to move from a start position to an end position. A trajectory control system of the autonomous vehicle may identify its current position and control the autonomous vehicle along the predefined trajectory.

As personnel may be present on the mine site, a means to protect personnel from the autonomous machines when they are in an autonomous operating zone may be required, in particular in the event of a machine malfunction or unintended operation.

Further, there may be a need for personnel to be able to safely approach an autonomous vehicle. In particular, a means may be needed to ensure safe access and egress from autonomous machines. For example, if the autonomous vehicle has an autonomous mode where the trajectory control system autonomously controls the vehicle, and a manual mode, where the vehicle is controlled by a driver, the driver may need to approach and enter the vehicle to transition from autonomous mode to manual mode.

US 2003/0102974 A1 shows a method and system for tracking the location of an object near a machine at a site.

US 2017/0270761 A1 shows a computerized safety tracking and proximity warning method and system for personnel, plant and equipment.

SUMMARY

In an aspect of the present disclosure, a mechanism to wirelessly stop autonomous vehicles may be deployed in the event of a machine malfunction or unintended operation.

In an aspect of the present disclosure, a portable device is provided for wirelessly stopping autonomous machines that includes the ability to stop all vehicles and/or a selected vehicle.

The present disclosure comprises the concept of a wireless remote device that is capable to identify machines within a prescribed radius.

The present disclosure comprises the concept of a wireless remote device with a user interface that allows a user to selectively inhibit machines (not a global inhibit of machines). This may support the use case of safely accessing and egress to/from a particular autonomous machine.

The present disclosure comprises the concept of a two stage detent button on a wireless device configured such that the user pushes through the local emergency stop before they reach the second detent position which is a global stop.

The present disclosure comprises the concept of a local emergency stop with a safety bubble of configurable radius around the user when depressed.

The present disclosure comprises the concept of an ever-present safety bubble of configurable radius around the user.

The present disclosure comprises the concepts for adding and removing portable devices without disruption to operations.

In a first embodiment, a system for controlling a plurality of autonomous vehicles on a mine site is provided, the system comprising a centralized platform configured to store an inventory list of vehicles travelling on the mine site and comprising a first communication interface configured to communicate missions to the vehicles, and a plurality of autonomous vehicles, the autonomous vehicles comprising: a first communication interface configured to wirelessly communicate with the centralized platform for receiving a predetermined mission, a trajectory control system configured to autonomously control the autonomous vehicle according to the predetermined mission; and at least one portable device, the portable device comprising a second communication interface configured to wirelessly communicate with a second communication interface of the plurality of vehicles from the mine site.

In a second embodiment, a system for controlling a plurality of autonomous vehicles on a mine site is provided, the system comprising: a centralized platform configured to store an inventory list of vehicles travelling on the mine site and configured to communicate missions to the vehicles; and a plurality of autonomous vehicles, the autonomous vehicles comprising: a transmitter configured to wirelessly communicate with the centralized platform for receiving a predetermined mission, a trajectory control system configured to autonomously control the autonomous vehicle according to the predetermined mission, at least one portable device comprising: a transmitter configured to wirelessly communicate with at least one out of the centralized platform and the plurality of vehicles from the mine site, and a user interface for selecting at least one vehicle out of the plurality of autonomous vehicles and for inputting an inhibit command for at least one out of inhibiting and stopping motion of the selected vehicle.

In a third embodiment, a method for controlling a plurality of autonomous vehicles on a mine site is provided, the method comprising: storing an inventory list of vehicles travelling on the mine site in a centralized platform and communicating missions from the centralized platform to the vehicles using a first communication interface of the centralized platform and the autonomous vehicles; and operating a plurality of autonomous vehicles, comprising: receiving a mission from the centralized platform via the first communication interface, and autonomously controlling the autonomous vehicle according to the predetermined mission. The method further comprises operating at least one portable device, the operating including communicating with a second communication interface of the plurality of vehicles from the mine site, and/or selecting at least one vehicle out of the plurality of autonomous vehicles on a user interface of the handheld device and inputting an inhibit command for at least one of inhibiting and stopping motion of the selected vehicle.

The portable device may be a hand held device.

In an embodiment, the system may further comprise a personnel location tag configured to constantly inhibit motion of all vehicles out of the plurality of autonomous vehicles present within a predetermined distance from the personnel identification tag and/or configured to make its location visible to the central platform.

In this way, the operation safety of a system for controlling a plurality of autonomous vehicles on a mine site may be improved.

DETAILED DESCRIPTION

In the following, embodiments of a system for controlling a plurality of autonomous vehicles on a mine site and embodiments of autonomous vehicles to be used on a mine site are described with respect to the drawings.

Figure 1:
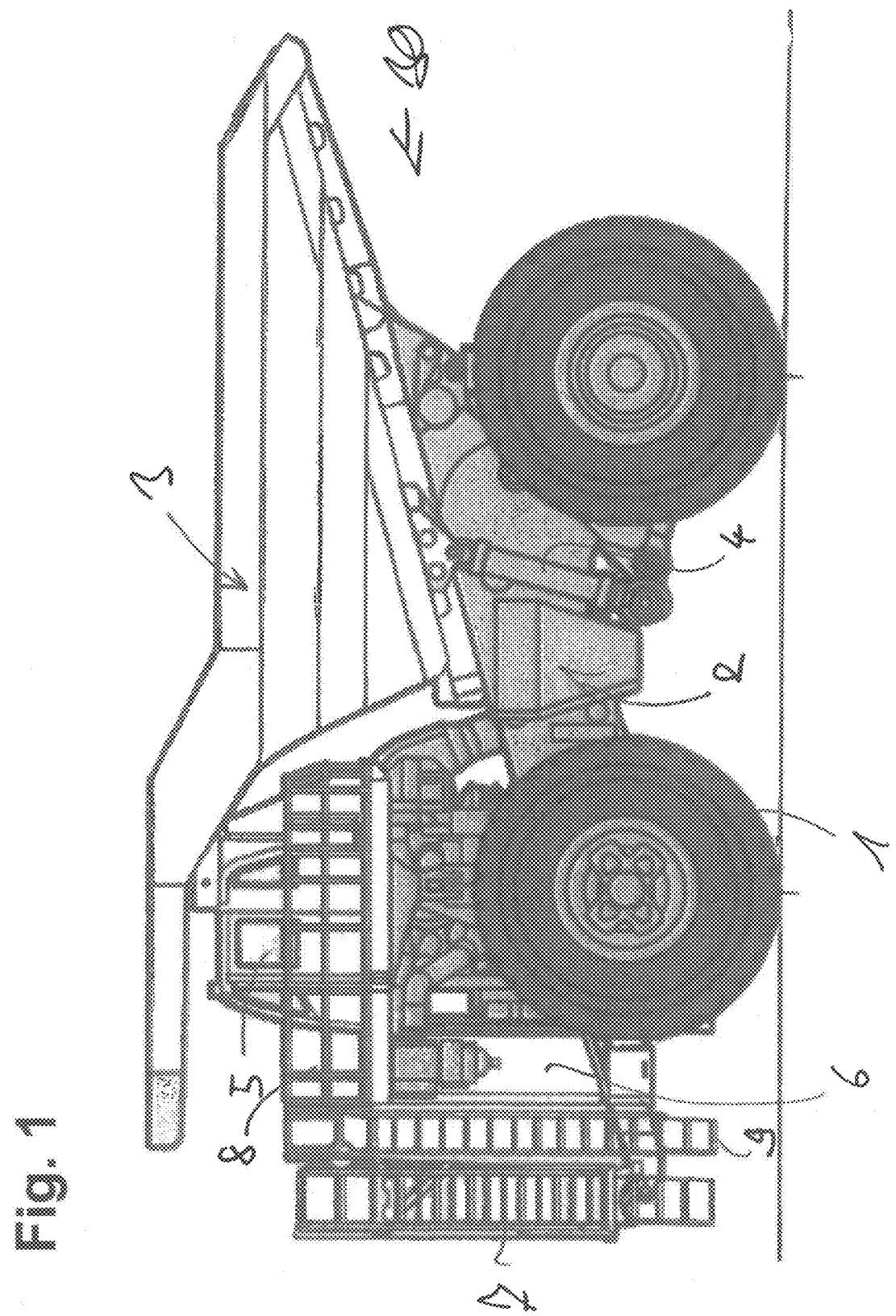
FIG. 1 is a side view of an embodiment of an autonomous dumper truck, the dumper truck forming an example of an autonomous vehicle of the present disclosure.

FIG. 1 shows an example of an autonomous vehicle to be used on a mine site. In the embodiment, the vehicle is a dumper truck as for transport purposes on the mine site. The dumper truck may have a payload of 100 metric tons or more.

The dumper truck 30 comprises a chassis 2 that is movable on wheels 1. The wheels 1 are driven by a drive unit 6 comprising at least one engine. The engine may be an internal combustion engine, e.g., a diesel engine. In an embodiment, the drive unit 6 may be a diesel-electric drive unit. The wheels may be driven by electric motors powered by a generator, the generator in turn driven by the diesel engine.

The dumper truck shown in FIG. 1 comprises a dump body 3 mounted on the chassis 2. The dump body is attached to the chassis with a horizontal pivot axis, and can be swiveled up by hoist cylinders 4 in order to let material contained in the dump body slide out of the dump body to the rear side of the dumper truck.

The dumper truck further comprises a cab 5 for a driver, in order to allow a manual operation of the dumper truck. In particular, the dumper truck may have an autonomous mode where a trajectory control system mounted on the truck autonomously controls the truck, and a manual mode, where the vehicle is controlled by a driver.

In the embodiment, the cab 5 is provided on a platform 8 arranged above the heat exchanger 9 and accessible via stairs 7. In other embodiments, no cab may be provided.

The dumper truck further comprises a vehicle controller for autonomously controlling the vehicle. The vehicle controller in particular may comprise a trajectory control system for autonomously controlling the truck on a predefined mission.

Figure 2:
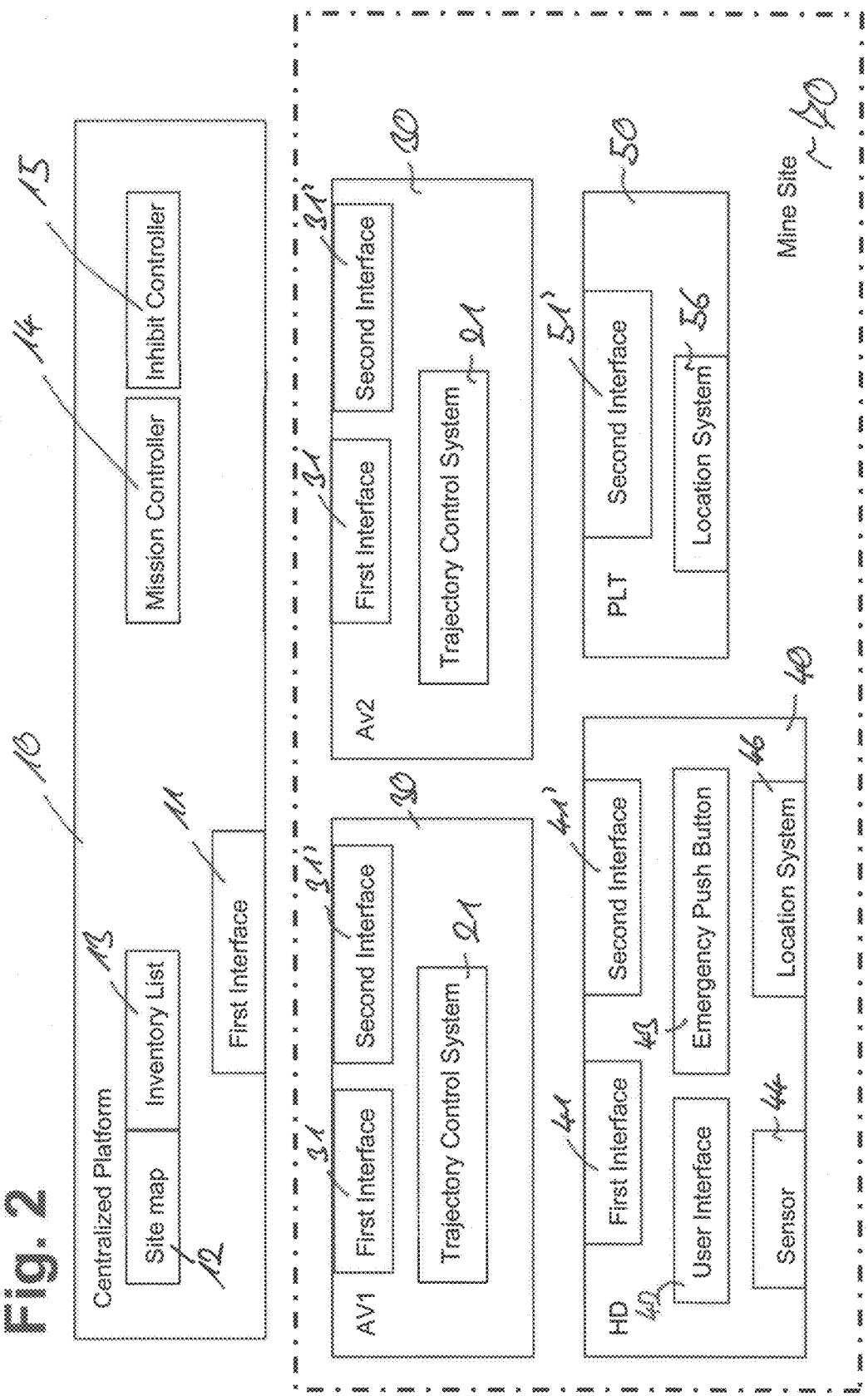
FIG. 2 is a schematic drawing showing functional parts of an embodiment of a system for controlling a plurality of autonomous vehicles on a mine site of the present disclosure.

FIG. 2 shows functional parts of an embodiment of a system for controlling a plurality of autonomous vehicles, such as dumper truck 30, on a mine site 70, the system comprising a central platform 10, such as a fleet/traffic management system, the plurality of autonomous vehicles 30 and at least one portable device 40 or 50. The portable device may be a hand held device 40 or a personnel location tag 50. Even though FIG. 2 only shows two portables devices 40 and 50, the system may comprise a plurality of portable devices 40 and/or a plurality of portable devices 50.

The centralized platform 10 may comprise at least one microprocessor and software stored on non-transitory memory, the software running on the microprocessor to implement the functionality and sub-systems of the centralized platform 10 described herein. The various sub-systems of the centralized platform 10 may be implemented by software and/or hardware components of the centralized platform 10. The centralized platform 10 may be further provided with input and/or output devices allowing supervision and/or control of the centralized platform 10 by personnel.

The centralized platform 10 may comprise a mission controller 14 configured to determine and communicate missions to the vehicles 30. In particular, the centralized platform 10 may be configured to provide predetermined trajectories to the autonomous vehicles 30.

In an embodiment, the centralized platform 10 comprises an electronic storage configured to store an inventory list 13 of the vehicles 30 travelling on the mine site 70. Further, the electronic storage may be configured to store a site map 12 of the mine site.

For communication between the centralized platform and the vehicles 30, the portable devices 40 and the personnel location tags 50, the centralized platform 10 is provided with a first communication interface 11. The first communication interface 11 of the centralized platform may be used to communicate missions to the autonomous vehicles 30. A mission may in particular comprise a trajectory for the autonomous vehicle 30 to follow on the mission. The first communication interface 11 may further be used to receive location or status information from the autonomous vehicles 30 and/or the portable devices 40, 50.

The centralized platform may further comprise a second communication interface, not shown in the figures. The second communication interface may be used, instead of or in addition to the first communication interface, to receive location or status information from the autonomous vehicles 30 and/or the portable devices 40, 50.

The first communication interface 11 and the second communication interface of the centralized platform may comprises separate hardware such as separate communication controllers, amplifiers, and/or antennas. In an embodiment, the centralized platform may only comprise the first communication interface 11.

The centralized platform 10 may comprise a complete list of vehicles and portable devices, updated by the information received via the first and/or second communication interface.

The autonomous vehicles 30 may each be provided with a first communication interface 31 for establishing communication with the first communication interface 11 of the centralized platform 10. The first communication interface 31 of the autonomous vehicles may be used for receiving predetermined missions from the first communication interface 11 of the centralized platform 10.

Each autonomous vehicle may further comprise a trajectory control system 21. The trajectory control system 21 may be configured to autonomously control the autonomous vehicle 30 according to the predetermined mission received from the centralized platform 10.

Each autonomous vehicle may further comprise a second communication interface 31'. The first communication interface 31 and the second communication interface 31' may comprises separate hardware such as separate communication controllers, amplifiers, and/or antennas. In an embodiment, the second communication interface 31' may be used to directly communicate between a first autonomous vehicle and a second autonomous vehicle (V2V). In an embodiment, the second communication interface 31' may be used to exchange position and/or heading information between the autonomous vehicles.

The system may further comprise at least one portable device 40, 50. The portable device 40, 50 may comprise a second communication interface 41, 51 configured to wirelessly communicate with at least one of the second communication interface of the centralized platform 10 and the second communication interface 31' of the plurality of vehicles 30 from a location on the mine site.

The portable device 40, 50 may comprise at least one microprocessor and software stored on non-transitory memory, the software running on the microprocessor to implement the functionality and sub-systems of the portable device 40, 50 (such as method 700 described in more detail below) and the features for taking part in the control of the system described herein. The various sub-systems of portable device 40, 50 may be implemented by software and/or hardware components. The portable device 40 may be further provided with input and/or output devices.

In an embodiment, the portable device 40, 50 may comprise a location system 46, 56 configured to detect a position and/or pose of the portable device 40, 50 on the mine site 70. For example, the location system 46, 56 may comprise a receiver configured to receive signals from a satellite based navigation system such as GPS, or from a mine site navigation system. The location system 46, 56 may further comprise gyroscopes and/or acceleration sensors.

In an embodiment, the portable device 40 may comprise at least one of a user interface 42 and an emergency push button 43. In an embodiment, the portable device 40 may be further provided with at least one sensor 44.

In an embodiment, the portable device 40 may comprise a first communication interface 41 configured to communicate with the first communication interface 11 of the centralized platform. The first communication interface 41 and the second communication interface 41' may comprise separate hardware such as separate communication controllers, amplifiers, and/or antennas. In an embodiment, the portable device 40, 50 may be configured to communicate location information such as its position and/or heading via the first communication interface 41 to the first communication interface 11 of the centralized platform. In an embodiment, the portable device 40, 50 may be configured to communicate location information such as its position and/or heading via the second communication interface 41', 51' to the second communication interface 31' of the autonomous vehicles. In an embodiment, the portable device 40 or 50 may only comprise a second communication interface.

In an embodiment, the first communication interfaces 11, 31, 41 and 51 may be provided by wireless communication interfaces, in particular radio interfaces. In an embodiment, the mine site may be provided with a radio communication system, such as a cellular system, in order to provide the first communication interfaces between the centralized platform 10, the vehicles 30 and the portable devices 40, 50. In an embodiment, the radio communication system may cover all the traversable areas of the mine site, e.g., all the areas where the vehicles 30 are allowed to travel. In an embodiment, the second communication interfaces 11', 31', 41' and 51' may be provided by wireless communication interfaces, in particular radio interfaces. In an embodiment, the first communication interfaces may have a bigger data bandwidth than the second communication interfaces.

In an embodiment, the second communication interfaces may have a better reliability than the second communication interfaces. For example, the second communication interfaces may provide redundancy while the first communication interfaces may not. In an embodiment, the second communication interfaces may be short-range communication interfaces.

In particular, the vehicles 30, the portable devices 40, and the personnel location tags 50 may be provided with V2V transmitters to provide the second communication interfaces for directly communicating with each other. In an embodiment, the V2V transmitters are wireless interfaces, in particular radio interfaces. The V2V communication interfaces may be short range interfaces allowing communication between two vehicles or a vehicle and a portable device 40, 50 via the second communication interfaces once they are close to each other. In particular, the V2V communication may be independent from the central radio network used for providing the first communication interfaces used for communicating with the centralized platform 10.

Figure 3:
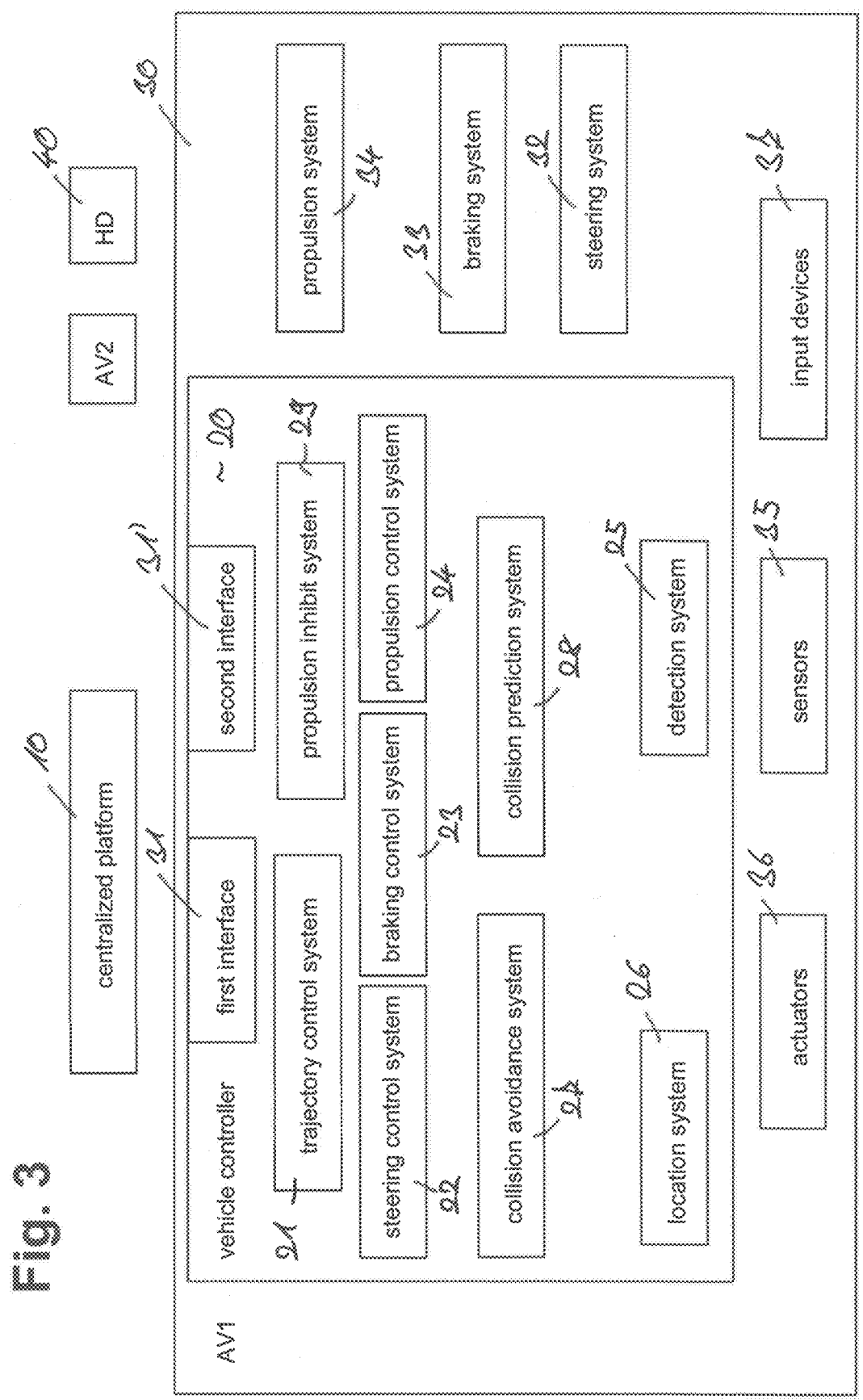
FIG. 3 is a schematic drawing showing functional parts of an embodiment of an autonomous vehicle of the present disclosure.

Further functional parts of an embodiment of a vehicle controller 20 of an autonomous vehicle 30, as well as other components of the autonomous vehicle, are further described with respect to FIG. 3. FIG. 3 only describes an example for a vehicle controller to be used on each of the plurality of autonomous vehicles of the system, and other configurations are equally possible.

The autonomous vehicle may comprise a propulsion system 34, a braking system 33 and a steering system 32. The propulsion system 34 may in particular comprise one or more motors for driving the wheels of the vehicle. The vehicle may further comprise a vehicle controller for controlling at least one out of the propulsion system 34, the braking system 33 and the steering system 32.

The vehicle controller 20 may comprise at least one microprocessor and software stored on non-transitory memory, the software running on the microprocessor to implement the functionality and sub-systems of the vehicle controller described herein. The various sub-systems of the vehicle controller may be implemented by software and/or hardware components of the vehicle controller.

The vehicle controller may comprise a propulsion inhibit system 29 configured to inhibit propulsion of the vehicle when an inhibit command is received from the centralized platform 10, a portable device 40, or a personnel location tag 50. In particular, the propulsion inhibit system 29 may cut off power to the propulsion system 34 of the vehicle. The propulsion inhibit system 29 may be configured to reconnect power to the propulsion system 34 on receiving a release command. The autonomous vehicle may in particular comprise the functionality for inhibiting propulsion described in co-pending application U.S. Ser. No. 16/412,128 filed on May 14, 2019, the entire disclosure of which is incorporated herein by reference.

In an embodiment, the vehicle controller may comprise a location system 26 configured to detect a position and/or pose of the autonomous vehicle 30 on the mine site 70. For example, the location system may comprise a receiver configured to receive signals from a satellite based navigation system such as GPS, or from a mine site navigation system. The location system may further comprise gyroscopes and/or acceleration sensors.

The vehicle controller 20 of the autonomous vehicle may further comprise the trajectory control system 21 described above. The trajectory control system 21 may be configured to autonomously control the autonomous vehicle 30 according to the predetermined mission received from the centralized platform 10 via the first communication interfaces 11 and 31. In an embodiment, the vehicle controller 20 may comprise a steering control system 22 configured to control the steering system 32 of the autonomous vehicle, a propulsion control system 24 configured to control the propulsion system 34 of the vehicle and a braking control system 23 configured to control the braking system 33 of the autonomous vehicle.

In an embodiment, the trajectory control system 21 may be configured to autonomously control the autonomous vehicle 30 via the steering control system 22, the propulsion control system 24 and the braking control system 23 to follow a trajectory defined by the mission. In particular, as part of the mission, the centralized platform 10 may communicate a predetermined trajectory to the autonomous vehicle 30, and the trajectory control system 21 may be configured to autonomously control the autonomous vehicle 30 via the steering control system 22 and the braking control system 23 along the predefined trajectory.

In an embodiment, the autonomous vehicle may be configured to communicate location information such as its position and/or heading via the first communication interface 31 to the first communication interface 11 of the centralized platform. In an embodiment, the autonomous vehicle may be configured to communicate location information such as its position and/or heading via the second communication interface 31' to the second communication interface 31' of other autonomous vehicles and/or the second communication interface 41' or 51' of the portable devices 40, 50.

The vehicle controller 20 may further comprise a detection system 25. The detection system 25 may be configured to evaluate the signals of sensors 35 arranged on the autonomous vehicle. The detection system 25 may be configured to detect obstacles such as other vehicles or personnel by evaluating sensor information received from at least one sensor 35 of the autonomous vehicle. The sensors may comprise optical and/or RF sensors. The detection system 25 may be augmented by data received from other vehicles and/or portable devices via the second communication interface 31'.

Further, the vehicle controller 20 may comprise a collision prediction system 28 configured to predict collisions with obstacles such as the other vehicles detected by the detection system 25. Further, in an embodiment, the vehicle controller may comprise a collision avoidance system 27. The collision avoidance system may be configured to autonomously re-plan a predetermined trajectory onboard the vehicle if the collision prediction system 28 predicts a collision, in order to provide a re-planned trajectory avoiding the collision.

The vehicle controller 20 may be connected to the sensors 35. At least one sensor 35 is connected to the detection system 25 and allows the detection system 25 to detect obstacles such as other vehicles.

The vehicle controller 20 may be further connected to actuators 36. Such actuators may include steering actuators connected to the steering control system 22, allowing the steering control system to steer the vehicle, and braking actuators connected to the braking control system 23, allowing the braking control system to brake the vehicle.

The vehicle may further comprise input devices 37. In an embodiment, the input devices allow a driver to drive the autonomous vehicle in a manual operation mode by controlling the propulsion system 34, the braking system 33, and the steering system 32. For example, the input devices may comprise a steering wheel, a brake pedal and/or a propulsion pedal. The input devices may be connected to the vehicle controller 20. The vehicle controller may provide a drive by wire functionality. In an embodiment, the input devices may allow a driver to switch the autonomous vehicle from an autonomous operation mode to a manual operation mode and/or back.

The autonomous vehicle may in particular comprise the functionality for to switch the autonomous vehicle from an autonomous operation mode to a manual operation mode and/or back described in co-pending application U.S. Ser. No. 16/412,128 filed on May 14, 2019, the entire disclosure of which is incorporated herein by reference.

Various embodiments of the system, using embodiments of autonomous vehicles as described above, or other types of autonomous vehicles, are described in the following with respect to FIG. 2 and FIGS. 4 to 6:

In an embodiment, the user interface 42 of the portable device 40 may be configured for displaying information identifying at least a subset of vehicles out of the plurality of autonomous vehicles 30, the subset of vehicles being determined based on a distance with respect to the portable device 40.

In an embodiment, the subset of vehicles may be determined by selecting all vehicles out of the plurality of autonomous vehicles present within a predetermined distance 60 of the portable device 40. In an embodiment, the predetermined distance 60 may be configurable. In particular, the predetermined distance 60 may be configurable from the centralized platform 10.

In an embodiment, the plurality of autonomous vehicles each comprise a location system 26 for determining a position of the autonomous vehicle and the portable devices 40 and the plurality of autonomous vehicles 30 are configured to communicate the position of the plurality of autonomous vehicles 30 to the portable device 40 via the second communication interface 31', 41'.

In an embodiment, the portable device 40 comprises a location system 46 and a user interface 42, the location system 46 being configured to determine the position of the portable device 40 and the user interface 42 being configured for displaying information identifying at least a subset of vehicles out of the plurality of autonomous vehicles 30 based on the position communicated via the second communication interface 41'. In particular, the subset of vehicles may be determined based on a distance with respect to the position of the portable device 40.

In an embodiment, the portable device 40 may comprise a user interface 42 configured for inputting an inhibit command for at least one of inhibiting and stopping motion of at least one out of the plurality of autonomous vehicles 30. In an embodiment, the user interface 42 may be configured for specifically selecting the at least one vehicle that is inhibited out of the subset of vehicles identified by the user interface 42.

In an embodiment, the system is configured to communicate to the centralized platform 10 at least one of a location of the portable device 40, 50, a location of the plurality of autonomous vehicles 30 on the mine site, and a state of at least one out of the plurality of autonomous vehicles 30 via the first communication interface 11.

In an embodiment, the second communication interfaces 31' may be configured to exchange data on at least one out of a position and a heading directly between at least two out of the plurality of autonomous vehicles 30.

In an embodiment, the user interface of the portable device may be configured for selecting at least one vehicle out of the plurality of autonomous vehicles and for inputting an inhibit command for inhibiting motion of the selected vehicle. In an embodiment, the user interface may be configured for displaying information identifying at least a subset of vehicles out of the plurality of autonomous vehicles for selection. In an embodiment, the subset of vehicles is determined based on a distance 60 with respect to the portable device 40. In an embodiment, the subset of vehicles may be determined by selecting all vehicles out of the plurality of autonomous vehicles present within a predetermined distance 60 of the portable device 40. In an embodiment, the predetermined distance 60 may be configurable. In particular, the predetermined distance 60 may be configurable from the centralized platform 10 or from the user interface of the portable device 40.

Figure 4:
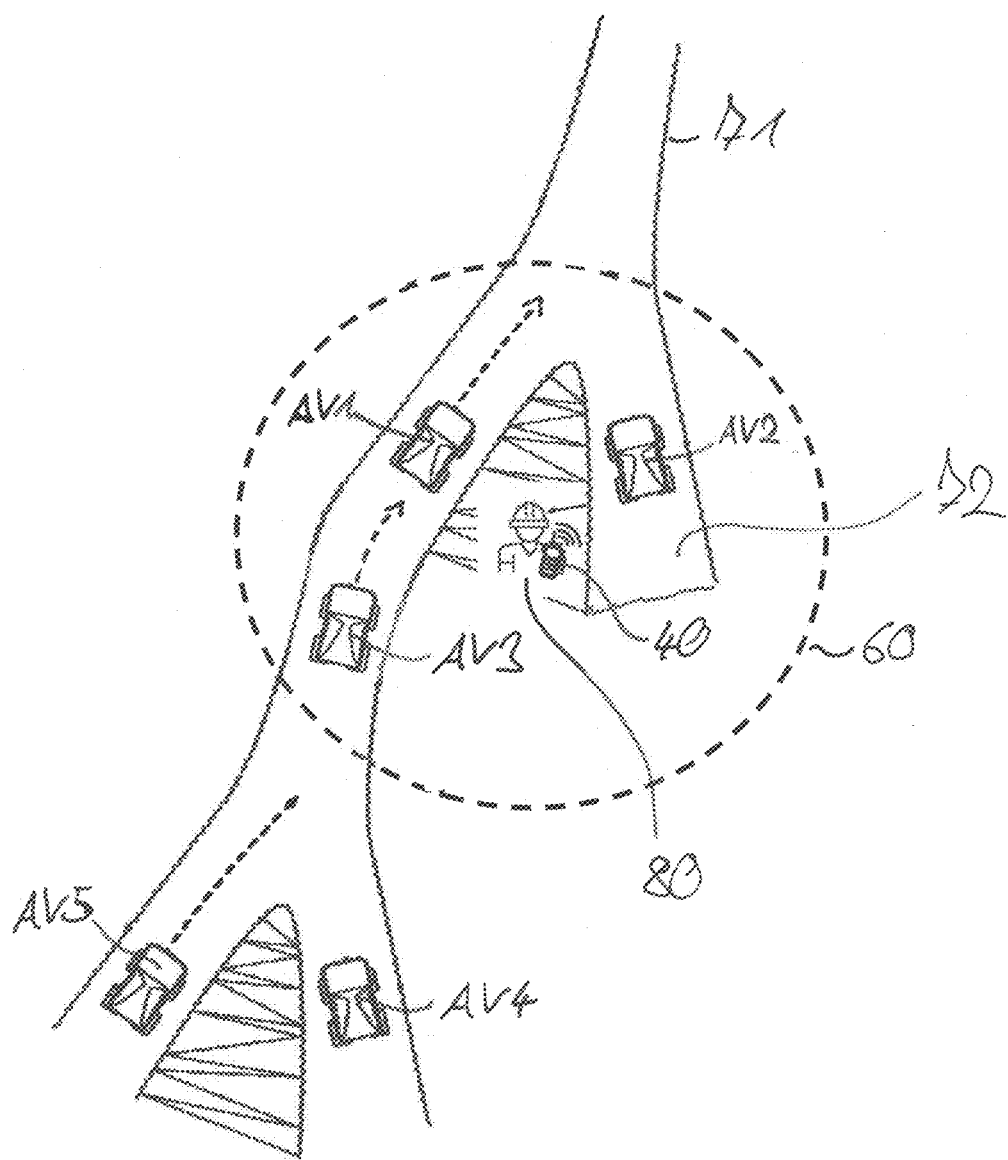
FIG. 4 is a schematic drawing showing a use case on a mine site.

Further optional features and use scenarios of the present disclosure are described in the following:

As shown in FIG. 4, the portable device may be used on a mine site 70 on which a plurality of autonomous vehicles AV1 to AV5 are present. Personnel 80 present on the mine site wants to approach vehicle AV2. For example, vehicles AV1 and AV3 to AV5 may travel along a road 71, while vehicle AV2 may be parked on a parking area 72 to be serviced or to be switched from autonomous operation to manual operation.

If a local emergency stop would be initiated by the personnel, e.g., an emergency stop that inhibits propulsion of all vehicles present within a certain distance 60 to the portable device, this would not only inhibit vehicle AV2, but also vehicles AV1 and AV3 and therefore stop traffic on road 71. However, as the vehicles driving on the road pass the parking area 72 with a safe distance, this is not required to guarantee safety of the personnel 80.

The portable device therefore displays all the vehicles present within the certain distance 60 to the portable device 40, and allows a user (e.g., the personnel 80) to select one or several of the displayed vehicles for inhibiting propulsion only of the selected vehicle(s). For this purpose, the portable device may receive location information determined by the location systems 26 of the vehicles via the second communication interfaces 31' and 41' and determine their distance from the portable device by comparing their position with the position of the portable device determined by its location system 46.

Figure 5:
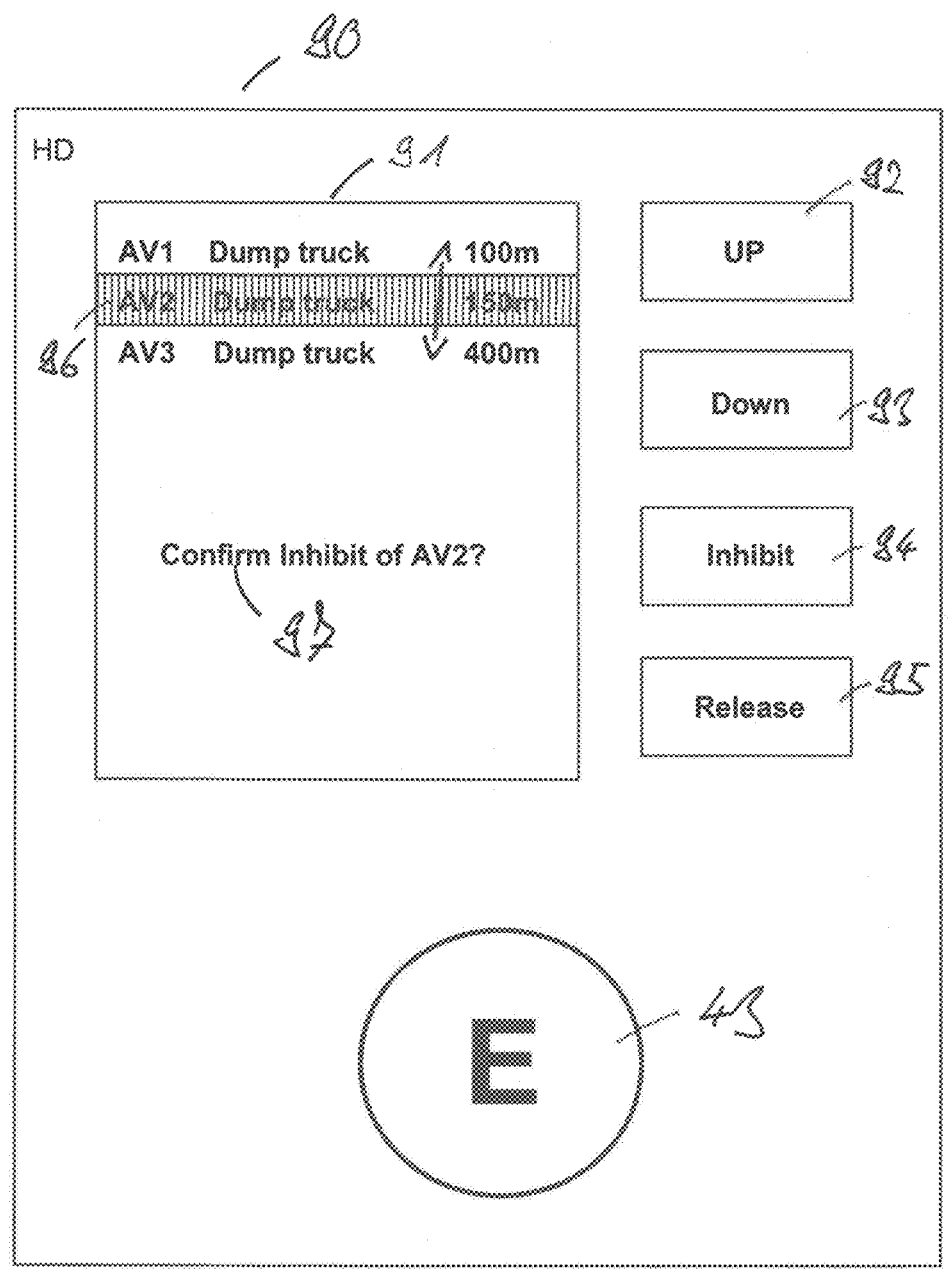
FIG. 5 is a schematic drawing showing an embodiment of a portable device.

FIG. 5 shows an embodiment of a portable device 90 having a display 91, selection keys 92 and 93 as well as an inhibit command key 94. The embodiment shown in FIG. 5 may further have the features already described above with respect to the embodiment shown in FIG. 2. In the embodiment, the user interface is configured for displaying the subset of vehicles in an order depending on their distance to the portable device 40. In particular, the display shows a list of all the vehicles AV1 to AV3 present within the certain distance 60, with the vehicles shown from top to bottom in an order of increasing distance.

In the embodiment, the UP- and Down-keys 92 and 93 may be used to move a selector bar 96 through the list to select the vehicles to be inhibited. By pressing the inhibit key 94, the selected vehicle is inhibited. In the embodiment shown, inhibiting of a vehicle has to be confirmed, e.g. by again pressing the inhibit key 94 after a corresponding prompt 97. The inhibit command may be sent from the portable device 40 to the corresponding autonomous vehicle via the second communication interfaces 41' and 31'.

The centralized platform may be informed of the inhibit command by the portable device 40 via the first communication interfaces 41 and 11. Alternatively or in addition, the centralized platform may be informed of the inhibit state by the autonomous vehicle 30 via the first communication interfaces 31 and 11.

The interface 42 of the portable device may be further configured for inputting a release command for releasing the inhibit command. In the embodiment shown in FIG. 5, this is provided by the release key 95. The vehicle that is to be released can again be selected by the selector keys 92 and 93. By pressing the release key 95, inhibition of the selected vehicle is released. In the embodiment shown, release of a vehicle has to be confirmed, e.g. by again pressing the release key 95 after a corresponding prompt 97. The release command may be sent from the portable device 40 to the corresponding autonomous vehicle via the second communication interfaces 41' and 31'. The centralized platform may be informed of the release command by the portable device 40 via the first communication interfaces 41 and 11. Alternatively or in addition, the centralized platform may be informed of the released state by the autonomous vehicle 30 via the first communication interfaces 31 and 11.

Instead of showing the vehicles in an order depending on their distance to the portable device, the display could also be configured to graphically show their positon with respect to the portable device 40. For example, the display may show a map of the surrounding terrain and the vehicles present in this terrain. The display could also be provided in the form of a touch screen, allowing the control of the portable device by tapping on the relevant area of the touch screen. For example, vehicles displayed on the display may be selected by tapping on the location at which the vehicle is displayed. Regardless of the specific configuration of the display, the display may be configured to display identification and/or status information for the vehicles and/or a distance of the vehicle to the portable device.

In an embodiment of the present disclosure, the portable device may comprise a local emergency stop inhibiting motion of all vehicles out of the plurality of autonomous vehicles present within a predetermined distance from the portable device. In an embodiment, the local emergency stop may be activated by user input on the portable device. For example, a push button may be provided for activating the emergency stop. In an embodiment, the portable device may further comprise a global emergency stop for inhibiting motion of all vehicles out of the plurality of autonomous vehicles present on the mine site. In an embodiment, activation of the global emergency stop is only possible after activation of the local emergency stop.

For example, the local emergency stop may be activated by pushing a push-button of the portable device and the global emergency stop may be activated by pushing the same push-button, wherein the push-button has a first and a second stage, wherein the local emergency stop is activated by pushing the push-button to the first stage and the global emergency stop is activated by pushing the push-button through the first stage to the second stage.

In an embodiment, the portable device may be configured to constantly inhibit motion of all vehicles out of the plurality of autonomous vehicles present within the predetermined distance from portable device. For example, in this embodiment, the portable device may be configured as a personnel location tag 50 to be worn by all personnel on the mine site.

In an embodiment, the portable device may have a first local emergency stop that can be activated by user input from the portable device inhibiting motion of all vehicles out of the plurality of autonomous vehicles present within a first distance from the portable device and a second local emergency stop configured to constantly inhibit motion of all vehicles out of the plurality of autonomous vehicles present within a second distance from portable device. In particular, the second distance may be smaller than the first distance. In an embodiment, the predetermined distance or the first and second distance may be configurable. Configuration my for example be possible via the portable device and/or the centralized platform. In an embodiment, vehicles coming within the predetermined distance to the portable device after the local emergency stop has been activated are put into an inhibited state.

The commands for the local and/or the global emergency stop may be sent from the portable devices 40, 50 to the autonomous vehicles via the second communication interfaces 41', 51' and 31'. The centralized platform may be informed of the local and/or the global emergency stop commands by the portable device 40 via the first communication interfaces 41 and 11. Alternatively or in addition, the centralized platform may be informed of the emergency stop state by the corresponding autonomous vehicles 30 via the first communication interfaces 31 and 11. In an embodiment, the commands for the local and/or the global emergency stop may be sent from the portable devices 40, 50 via the central platform to the autonomous vehicles using the first and/or second communication interfaces.

The embodiments described above may also be combined. For example, the embodiment of FIG. 5 also comprises a local emergency stop button 43. The button may be a mechanical push button.

Further optional features of any of the embodiments described above and their combinations will be described in the following.

In an embodiment, the plurality of autonomous vehicles each comprise a vehicle controller for turning the vehicle into an inhibit sate by deactivating propulsion of the vehicle after receiving an inhibit command, in particular after receiving an inhibit command from the portable device via the second communication interface.

In an embodiment, if a portable device has an inhibit connection with a vehicle, and the connection is lost (e.g. due to a dead battery), the vehicle controller may communicate via the first communication interface to the centralized platform that the portable device has become unassociated with the network. In an embodiment, in case that the vehicle controller is switched off in an active inhibit state and switched on again, the vehicle will retain the active inhibit state until it is released by the portable device. In an embodiment, the centralized platform may control the vehicle controller, after it is switched on again, to start in an active inhibit state until it is released by the portable device. If the inhibit state has been released while the vehicle controller was shut off, the centralized platform may command the vehicle to immediately start with normal operation.

In an alternative embodiment, the vehicle controller may locally store the active inhibit state and, after it is switched on again, start in an active inhibit state based on the stored value until it is released by the portable device. If the inhibit state has been released while the vehicle controller was shut off, the centralized platform may command the vehicle to release the inhibit state and/or to update the stored value.

The system may be configured to operate with a plurality of portable devices. Not all of the portable devices need to have the specific functionality describe above.

In an embodiment, each of the plurality of portable devices may be configured to inhibit propulsion of vehicles. Therefore, a single vehicle may be subject to a plurality of inhibit commands received form a plurality of portable devices. In an embodiment, when a vehicle out of the plurality of autonomous vehicles is inhibited by inhibit commands received from at least two out of the plurality of portable devices, the vehicle may only be released after all inhibit commands have been released. In particular, the autonomous vehicles may have a "lock out" functionality where the release of an inhibit command must be from the specific device that activated it. For example, another handheld device cannot release the inhibit command from the device that activated it. The release is specific to the device.

In an embodiment, the portable device may have a pairing function for pairing and unpairing the portable device to the system. In an embodiment, deactivation of the portable device may only be possible in an unpaired state. In an embodiment, the central platform may monitor connection to all portable devices paired to the system and initiate a global emergency stop if connection is lost for a predetermined time. For this purpose, the centralized platform may comprise a second communication interface to communicate with the second communication interfaces of the portable devices in order to monitor their functionality.

In an embodiment, the portable device may comprise an inertial measurement unit 44 for determining at least one out of inactivity of personnel carrying the portable device and the portable device having been dropped by personnel carrying the portable device.

In an embodiment, the centralized platform 10 may be being configured to determine the location of the portable device 40 and of the plurality of autonomous vehicles 30 on the mine site 70. For this purpose, the portable devices and the vehicles may send location information regarding their current location to the centralized platform. The inventory list of the centralized platform may comprise, in addition to the autonomous vehicles present on the mine site, and an inventory of all paired portable devices.

In an embodiment, the centralized platform 10 may be configured to determine the subset of the plurality of vehicles present within the predetermined distance to a portable device. In the first and the second embodiment, the centralized platform may send identification information regarding the vehicles from the subset to the portable device.

In an embodiment, the centralized platform may control all the vehicles from the subset to turn into an inhibit state after receipt of a local emergency stop command from the portable device, or to constantly control any vehicle from the subset to turn into an inhibit state.

The system may be configured such that an inhibit control is also performed via the centralized platform.

The system may also be configured to operate using direct communication between the vehicles and the portable device, such that inhibit control may be performed both via the centralized platform and by direct communication.

Figure 6:
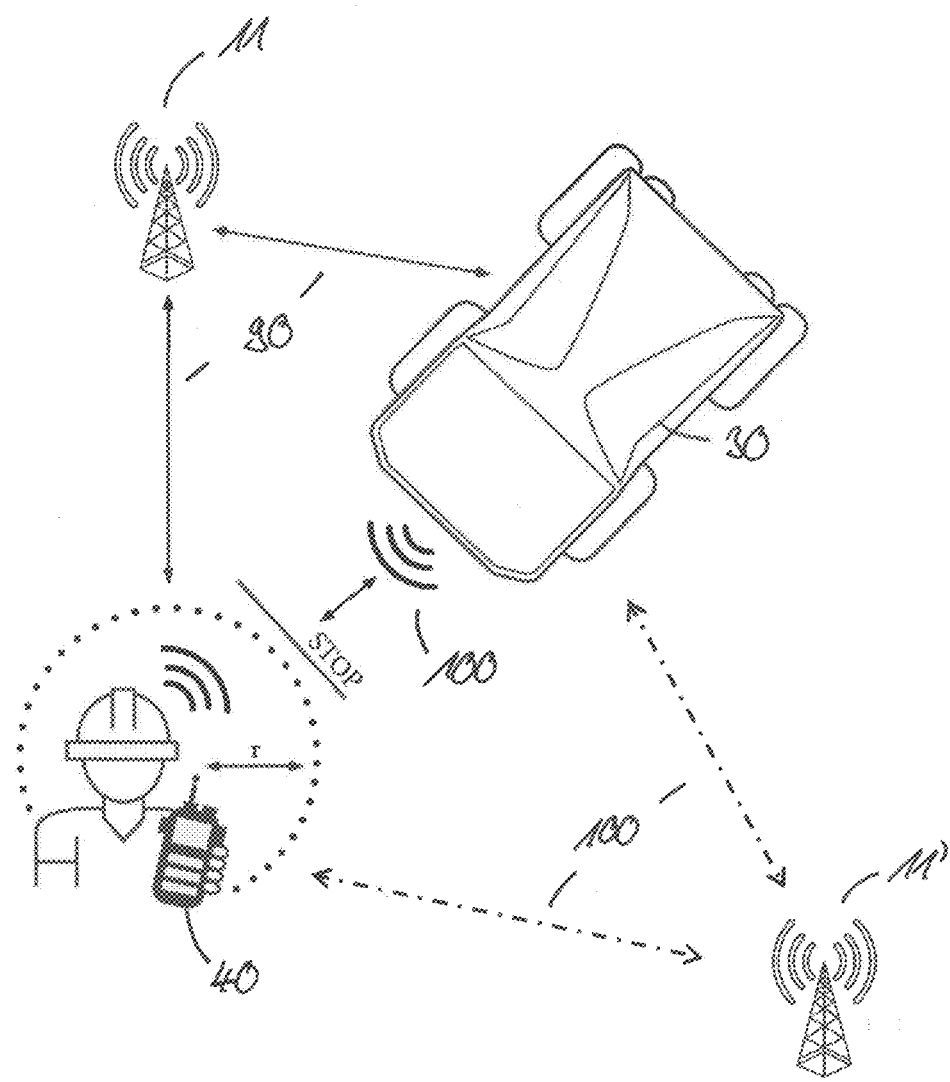
FIG. 6 is a schematic drawing showing communication between a portable device, the central platform and an autonomous vehicle in an embodiment of the present disclosure.

FIG. 6 shows an embodiment where there is both communication 90 via the first communication interfaces with the centralized platform 10 and direct communication 100 between the portable device and the vehicles 30 via the second communication interfaces.

The vehicles 30 may be configured to send out identification information and/or location information by direct communication. This may be part of a V2V communication as described in co-pending application U.S. Ser. No. 16/460,693 filed on Jul. 2, 2019, the content of which is included by reference in its entirety. In particular, the vehicles 30 may be configured to send out identification information and/or location information by direct communication at regular intervals. In particular, the direct autonomous machine to autonomous machine communication of position and heading may be used for collision avoidance using the second communication interface also used to communicate with the portable device. The same concept may also be used for portable or fixed devices mounted in a car and moving towards an autonomous truck. Thereby, collision avoidance/V2V functionality may be integrated within the wireless safety system RF infrastructure.

For example, the second communication interfaces may transmit characteristics for determining imminent collision with other autonomous vehicles or vehicles or personnel equipped with a portable device, for example, speed, heading, path, etc. The vehicle controllers of the autonomous vehicles may monitor all other surrounding systems and calculate potential for collision. Vehicle controllers of the autonomous vehicles may transmit data over the second communication interfaces detailing the location, speed, and heading of the nearest safety systems.

The collision avoidance module within the safety system may have the following responsibilities in regards to independently reporting the following:

Vehicle in front, on the same path: Vehicle 2 may transmit its parameters. Vehicle 1 may recognize that Vehicle 2 is following the approximate path that Vehicle 1 is. Vehicle 1 may recognize that Vehicle 2 is in front of Vehicle 1. Vehicle 1 may calculate that if Vehicle 2 stops, that it is in the same path and presents a potential collision. Vehicle 1 may transmit this information.

Vehicle in front, oncoming, in the opposite lane: Vehicle 3 may transmits its parameters. Vehicle 1 may recognize that Vehicle 3 is approaching Vehicle 1. Vehicle 1 may recognize that Vehicle 3 is traveling along a different path, which is in the opposite lane from Vehicle 1. Vehicle 1 may conclude that Vehicle 3 will safely pass without collision. Vehicle 1 may transmit this information.

Vehicle following, in the same lane: Vehicle 1 may transmits its parameters. Vehicle 2 may recognize that Vehicle 1 is behind Vehicle 2. Vehicle 2 may recognize that Vehicle 1 is traveling along a path which is the same lane as Vehicle 2. Vehicle 2 may calculate that Vehicle 1 does not pose a collision threat, regardless of the following distance, as it is behind it. Vehicle 2 may transmit this information.

The hand-held device may be configured to receive identification information and/or location information from the vehicles in their surroundings. The hand-held device may be configured to determine a distance between its location and the locations of the vehicles based on the information received. The hand-held device may be configured to determine the subset of vehicles within the predetermined distance. The hand-held device may be configured to send out inhibit commands to specific vehicles via direct communication. The hand-held device may be configured to send out local inhibit commands including information with respect to its location to all vehicles within reach via direct communication, and the vehicles may be configured to determine a distance to the hand held device and based on this distance decided whether the inhibit command is to be followed or not.

Hardware Units

The system may be comprised of multiple hardware units which all provide specific functionality. The system may include fixed infrastructure which may be used to ensure proper coverage of the autonomous operating zone and host of devices that are machine mounted, hand held, or attached to personnel. A vehicle controller may be installed onboard the truck in order to be integrated into the system. The handheld transmitter and personnel location tag are used by personnel to perform functions described later. They may be configured as embodiments of portable devices. The external buttons are used onboard the haul truck to perform their specific function. Fixed infrastructure may be used to extend radio signals based on geographic constraints and ensure complete coverage of the autonomous operating zone. The vehicle controller may be able to be paired with multiple handheld units and configurable through a wired or wireless connection to the system infrastructure.

Functionality

The system may provide one or more of the following functions:

The Local E-stop is a system which is actuated by pressing the red e-stop button on the wireless transmitter or a wired button. This initiates a safety rated e-stop of all assets within a configurable radius.

The All-Stop is a system which is an extension of the Local E-stop. It requires a Local E-stop to be actuated plus additional actions.

The inhibit system is a method in which a user can select a specific asset to inhibit, or place into a pause state. The use case for the inhibit system is safe ingress/egress from a vehicle and/or entering an asset into service.

The system can be put in Global E-Stop, Local E-stop, or inhibit by pushing the appropriate button on the transmitter, vehicle controller, or external button. A user interface on the handheld transmitter may be used to achieve inhibit on a desired asset.

The system may have the ability to configure a time with which to determine if wireless communication is lost between any transmitter and vehicle controller. If the set time has been reached the system may go into Global E-Stop.

The system may have the ability to exit E-Stop mode once all connected and paired equipment are no longer in E-Stop mode or position.

The system may have the ability to configure an external Watchdog with an adjust-able timeout.

If a wireless controller is attempted to be removed from operation, the system may prevent the removal process until the wireless controller releases all Local, All-Stop, and inhibits from the selected controller.

Specifics

Specifics of the various functions and hardware units of the embodiments of the system are described in the following:

Local E-Stop: Software and hardware output intended to stop all trucks within a configurable radius on the active network immediately from any transmitter or a local button. Once a Local E-stop is initiated, the safe outputs on the vehicle controller may be connected to ground, the safe state. The intention of this is to safety stop all trucks within a specified radius. If multiple Local E-stops are initiated, the vehicle controller may remain in safe state until all Local E-stops are cleared. At that time the vehicle controller may reconnect the input voltage to the safe output. Other systems onboard the truck will handle the re-activation process. The Local E-Stop may have a configurable radius. In particular, the radius in which a vehicle controller responds to a local e-stop request may be configurable. The Local E-Stop may be dynamic in such that any vehicle that gets closer to the actuating device than the configurable distance may also be placed into the safe state. In addition, if a vehicle is within the configurable distance when the Local E-Stop is initiated, the safe state is latched until the actuating device(s) are all cleared of the Local E-Stop. This is to cover the case that a vehicle is moving away from the actuating controller during the initiation of the Local E-Stop, but prior to coming to a stop has exceeded the radius.

Global All-Stop: The Global All-Stop is an extension of the Local E-Stop system. To activate a Global All-Stop, the Local E-Stop System is activated, followed by the depression of the same or another button or buttons on the wireless transmitter. Once actuated, the safe outputs on the vehicle controller may be connected to ground, the safe state. The intention of this is to safely stop all trucks that are part of the same wireless safety system. If multiple Global All-stops are initiated, the vehicle controller may remain in safe state until all Global All-stops are cleared. At that time the vehicle controller may reconnect the input voltage to the safe output. Other systems onboard the asset will handle the re-activation process. If the power to the vehicle controller is shut off with an all-stop, the system may retain the all-stop condition, as long as the wireless controller maintains the all-stop. The purpose of this is to latch the all-stop even if power to the vehicle is cycled.

Local Inhibit: The Local inhibit feature allows for a user to specify a particular truck in which to inhibit. By using the user interface on a wireless transmitter, the user may select a specific vehicle to inhibit. The user interface presents all assets able to be inhibited in order of distance (closest first) from the user. Once selected, the user may confirm the desire to inhibit again by a yes/no selection. Once the wireless transmitter initiates an inhibit, the vehicle controller of the selected vehicle may communicate the desire to inhibit. The reverse process may be required to uninhibit the vehicle. Multiple wireless controllers may be able to inhibit a single vehicle. Once an inhibit is initiated by a vehicle controller, it may remain in effect until all wireless controllers have un-inhibited the selected asset. If a wireless controller has an inhibit connection with a vehicle, and the connection is lost (e.g., dead battery), the vehicle controller may communicate that a wireless controller has become unassociated with the system. If the power to the vehicle controller is shut off with an active inhibit, the system may retain the inhibit condition, as long as the wireless controller maintains the inhibit with the specific vehicle. The purpose of this is to latch the inhibit even if power is cycled.

Collision Avoidance: Wireless safety systems may transmit characteristics necessary for determining imminent collision, for example, speed, heading, path, etc. Wireless safety systems may monitor all other surrounding systems and calculate potential for collision. Wireless safety systems may transmit data detailing the location, speed, and heading of the nearest safety systems. Transmitted parameters may be:

System ID #
VehicleType (Truck, Light Vehicle, Wheel Loader, Motor grader, Person, etc.)
Velocity
Heading
Projected Curvature Vehicle Controller: The vehicle controller may have the following functions: When the vehicle controller enters Global E-stop, Local E-stop, or inhibit mode the system may disconnect the high side stop output circuit. The stop output circuit may be two physical connections on the vehicle controller and may function identical to each other. Any required antennas may be able to be externally mounted on the truck and hardwired to the vehicle controller. The vehicle controller may communicate via various protocols. The communication may be a wireless communication. The vehicle controller may output the status of all current system functions to the truck and the active network.

V2V: The vehicle controller may include vehicle to vehicle communication to achieve the functionality described.

Handheld Transmitter: The handheld transmitter may have one or more of the following functions: When a handheld unit is paired to the system, the handheld may output a signal to the system when either E-Stop button is pressed, or released. The handheld unit may be unable to be powered off when it is paired with the system.

User Interface: The user interface of the handheld unit may be used to perform the inhibit function on a desired truck. A backlight may be used to ensure visibility at night. Screen may be readable in direct sunlight conditions. A touchscreen may be used. If a touchscreen is used there may be a lock feature to ensure the screen is not unintentionally used. When prompted by the user, the user interface may display the list of assets within range from the handheld unit. This range may be configurable through the master coordinator. During normal operation of the handheld unit, the screen may display the following:

Battery level (as a percentage)
Stop/inhibit status
Handheld ID
Screen lock status (if touchscreen is used)

To perform an inhibit function the user may prompt the list of available assets, select the desired asset, and press a button to activate inhibit. To exit an inhibit state the user may select the asset in the inhibited state, press a button, and the device may prompt the user for a confirmation to exit an inhibited state of the given asset.

Personnel Location Tag: A personnel tag may be used as a part of this system. The personnel location tag may activate a local E-stop under certain configurable rules.

External Stop/Inhibit Buttons: The external stop and inhibit buttons may be twist-to-release buttons which provide hardwired input to the vehicle controller. The external buttons are intended to be mounted inside the driver cab of the truck. The user may use them to perform an E-stop of the installed truck. The E-stop may be configurable for a global or local stop of the truck.

V2V (Vehicle to Vehicle): The safety system may have provisions to transmit certain information of interest to other vehicles in the vicinity. This information may be used to augment operations within the autonomous operating zone. Data reception task may listen to any assets within range and read the data. This information may not interfere with any other safety functions of the system. If necessary, this information may be transmitted and/or received by a separate radio. Examples of parameters for transmission on the V2V radio specific to a haul truck implantation of the system:

System ID: Mine ID of system transmitting V2V information
Loader request for specific truck to load
Loading Spot Point (local x,y coordinates): Sent by loader
Loading Spot Point Reached: Sent by Loader
Ready to Load: truck transmits ready to load signal
Current truck Payload
Final truck Payload
Bucket Delivered: Signal transmitted by Loader each time a bucket is delivered
Loading Complete: Loading tool transmits payload delivered
Load Bias: truck transmits % load of LF, RF, LR, RR—Total of 100%

Ore Details: Example—Copper #2

Figure 7:
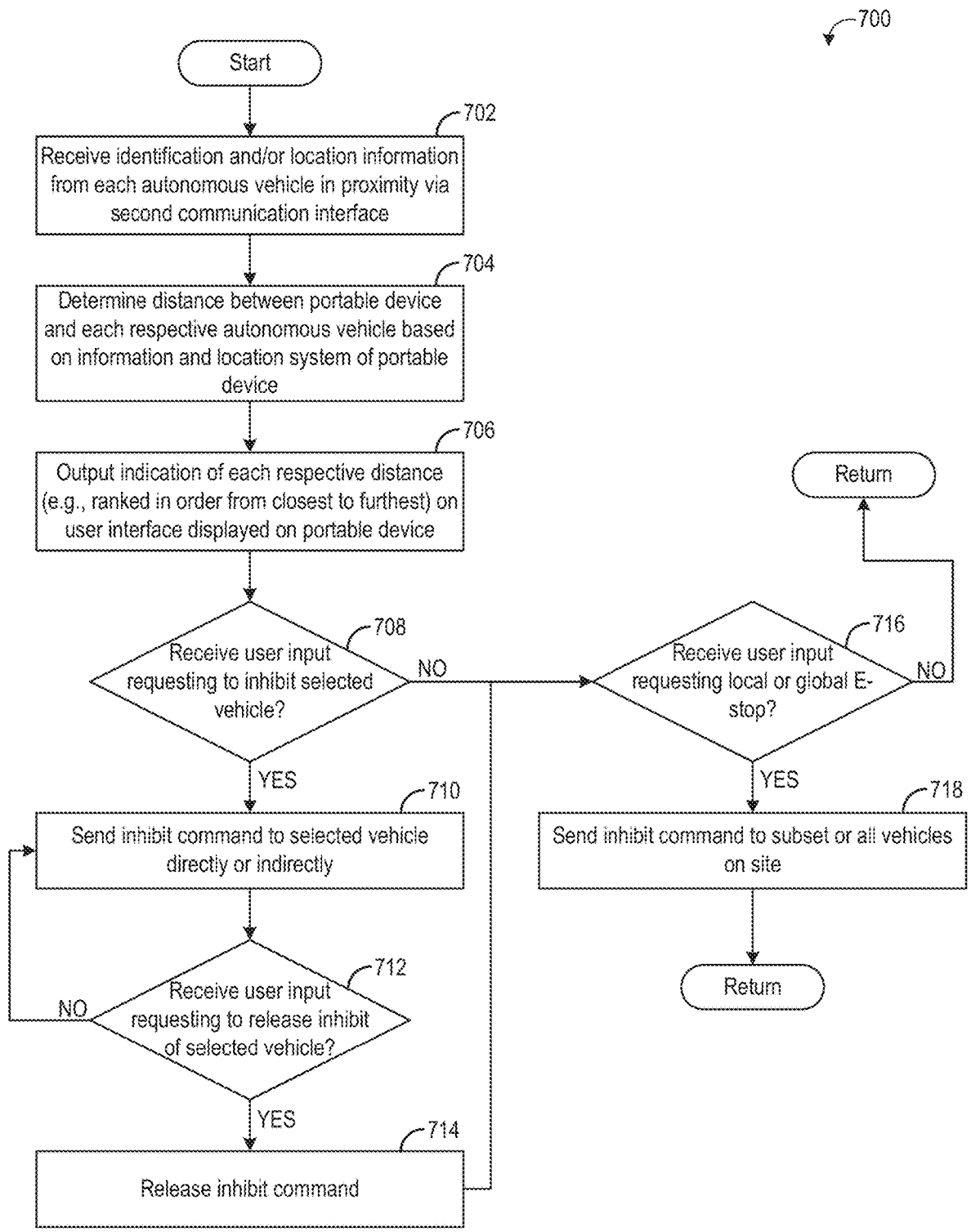
FIG. 7 is a flow chart illustrating a method for inhibiting motion of one or more autonomous vehicles with a portable device, according to an embodiment.

FIG. 7 is flow chart illustrating a method 700 for controlling autonomous vehicle motion via a portable device at a mine site or other suitable location. Method 700 may be carried out according to instructions stored in non-transitory memory of a portable device, such as portable device 40 of FIG. 2, in combination with one or more autonomous vehicles (e.g., vehicle(s) 30) and a centralized platform (e.g., centralized platform 10).

At 702, identification and/or location information is received at the portable device from each autonomous vehicle in proximity to the portable device via a second communication interface. In some examples, identification and/or location information is received from each autonomous vehicle in operation (e.g., powered on) that is within communication distance of the portable device. As explained above, the second communication interface may comprise V2V transmitters. For example, the portable device may have a V2V transmitter configured to communicate with respective V2V transmitters on each autonomous vehicle. When an autonomous vehicle is operational (such that the V2V transmitter of the autonomous vehicle is powered on/transmitting) and the transmitter of that autonomous vehicle is in range of the portable device, identification and/or location information of that autonomous vehicle may be sent to the portable device.

At 704, a respective distance between each autonomous vehicle and the portable device is determined based on the received information and a location system of the portable device. The location system of the portable device may be a GPS or other navigational system configured to determine a location of the portable device. Thus, based on the location information received for each autonomous vehicle and the location of the portable device as determined from the location system, a distance between the portable device and each autonomous vehicle may be determined.

At 706, an indication of each respective distance is output on a user interface displayed on the portable device. For example, as shown in FIG. 5, the user interface may display an identifier of each autonomous vehicle (e.g. AV1, AV2, etc.) and the distance of each autonomous vehicle from the portable device. The identifiers and distances may be displayed in a ranked order, such as from the closest vehicle to the furthest vehicle. In other examples, the user interface may display a map with the location of each autonomous vehicle (and the location of the portable device) graphically indicated.

At 708, method 700 includes determining a user input requesting to inhibit a selected vehicle has been received. The user input may include a touch input to the displayed indication of each respective distance, such as a touch input selecting a vehicle from the user interface as shown in FIG. 5, or a touch input selecting a vehicle from the map-like graphical representation shown in FIG. 4. In other examples, the user input may include depression of one or more mechanical or electronic buttons, such as selection of a vehicle via input to the up and down buttons shown in FIG. 5. Once a vehicle is selected, an additional user input may be entered to request that an inhibit command be sent for that vehicle, such as a touch input to or depression of an inhibit control button on the user interface. In some examples, after an initial selection and request to inhibit, a confirmation request may be output and a user input may be received confirming the inhibit request.

If a user input requesting to inhibit and/or stop motion of a selected vehicle is not received, method 700 proceeds to 716, which will be explained in more detail below. If a user input requesting to inhibit and/or stop motion of a selected vehicle is received, method 700 proceeds to 710 to send an inhibit command to the selected vehicle. The inhibit command may be sent directly (e.g., via the second communication interface) from the portable device to the selected vehicle. In other examples, the inhibit command may be sent indirectly, such as via the centralized platform. For example, via the first communication interface, the portable device may send the inhibit command (including an identifier of the selected vehicle) to the centralized platform, and the centralized platform may send the inhibit command to the selected vehicle (e.g., via the first communication interface).

As explained previously, the inhibit command may inhibit (e.g., slow) motion of the selected autonomous vehicle, and in some examples may inhibit the motion to such an extent that the selected autonomous vehicles comes to a stop. Each operational autonomous vehicle may operate according to a trajectory control system configured to autonomously control the autonomous vehicle according to a mission received from the centralized platform. When a selected autonomous vehicle receives an inhibit command, the mission is overridden and the trajectory control system instead slows the vehicle (e.g., to a stop).

At 712, method 700 determines if a user input requesting to release the inhibit command has been received. The user input may include a touch-based selection or depression of a release button on the user interface of the portable device. If a request to release the inhibit command has not been received, method 700 returns to 710 to continue to send the inhibit command, or to wait until a request to release the inhibit command has been received. If a request to release the inhibit command has been received, method 700 proceeds to 714 to release the inhibit command. Releasing the inhibit command may include stopping transmission of the inhibit command and/or sending a release command to the selected vehicle. Upon the inhibit command being released, the selected vehicle may resume autonomous operation according to the mission.

At 716, method 700 determines if a user input requesting a local emergency stop (local E-stop) or a global emergency stop (global E-stop) has been received. As explained previously, the local E-stop may be requested via a first user input to an E-stop button of the portable device (e.g., the local emergency stop button 43 of FIG. 5). The first user input may include pressing the button to a first stage. The global E-stop may be requested via a second user input to the E-stop button, such as the user pressing the button through the first stage to a second stage. If a user input requesting a local or global E-stop is not received, method 700 returns. If a user input requesting a local or global E-stop is received, method 700 proceeds to 718 to send an inhibit command to a subset of or all autonomous vehicles on site. If a local E-stop is requested, an inhibit command may be sent to all autonomous vehicles within a predefined distance of the portable device. If a global E-stop is requested, an inhibit command may be sent to all autonomous vehicles on site (e.g., all autonomous vehicles within the predefined distance and also all autonomous vehicles outside of the predefined distance). As explained previously, each inhibit command may slow and/or stop motion of the intended/target vehicle and may persist until the inhibit command for that vehicle is released. It should be understood that 716 may be performed at any time during execution of method 700, such that any time a user input is received requesting a local or global E-stop, the appropriate inhibit command(s) are sent. Method 700 then returns.

A technical effect of displaying a respective distance of each autonomous vehicle to a portable device and then sending an inhibit command to only selected vehicle(s) is that user override of autonomous operation of a vehicle may be overridden to increase safety without disrupting operation of other autonomous vehicles that do not pose a safety risk.

The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for controlling a plurality of autonomous vehicles on a mine site, the system comprising:
    a centralized platform comprising a processor and memory storing an inventory list of the plurality of autonomous vehicles travelling on the mine site and comprising a first communication interface configured to communicate missions to the plurality of autonomous vehicles, the first communication interface of the centralized platform comprising a first communication controller, amplifier, and/or antenna;
    the plurality of autonomous vehicles, each autonomous vehicle comprising:
        a corresponding first communication interface configured to wirelessly communicate with the centralized platform for receiving a predetermined mission, each corresponding first communication interface comprising a corresponding first communication controller, amplifier, and/or antenna;
        a corresponding second communication interface comprising a corresponding second communication controller, amplifier, antenna, and/or V2V transmitter; and
        a vehicle controller comprising a processor and memory configured to autonomously control that autonomous vehicle according to the predetermined mission; and
    a portable device, the portable device comprising a second communication interface comprising a second communication controller, amplifier, antenna, and/or V2V transmitter configured to wirelessly communicate directly with each corresponding second communication interface of each autonomous vehicle of the plurality of autonomous vehicles,
    wherein each autonomous vehicle of the plurality of autonomous vehicles comprises a first location system for determining a first position of that autonomous vehicle and wherein each autonomous vehicle is configured to directly communicate the first position of that autonomous vehicle to the portable device via the respective corresponding second communication interface, each first location system comprising a first receiver, gyroscope, and/or acceleration sensor,
    wherein the portable device further comprises a second location system and a user interface, the second location system comprising a second receiver, gyroscope, and/or acceleration sensor and being configured to determine a second position of the portable device and the user interface comprising a display and being configured for displaying information identifying at least a subset of autonomous vehicles out of the plurality of autonomous vehicles based on the first position communicated via the second communication interface, the subset of autonomous vehicles being determined based on a distance with respect to the second position of the portable device,
    wherein the portable device further comprises a local emergency stop that, when activated, causes the portable device to send a first command inhibiting motion of all vehicles out of the plurality of autonomous vehicles present within a predetermined distance from the portable device, and wherein the local emergency stop is activated by a first user input to a first push button on the portable device, and
    wherein the portable device further comprises a global emergency stop that, when activated, causes the portable device to send a second command for inhibiting motion of all vehicles out of the plurality of autonomous vehicles, wherein the global emergency stop is activated by a second user input to the first push button or a second push button on the portable device, and wherein activation of the global emergency stop is only possible after activation of the local emergency stop.

2. The system of claim 1, wherein the predetermined distance comprises a configurable radius, and wherein the subset of autonomous vehicles is determined by selecting all autonomous vehicles out of the plurality of autonomous vehicles present within the predetermined distance of the portable device.

3. The system of claim 1, wherein the user interface comprises the display and/or one or more keys configured for receiving an input from a user inputting an inhibit command for at least one of inhibiting and stopping motion of at least one of the plurality of autonomous vehicles, and wherein the inhibit command is communicated to the at least one of the plurality of autonomous vehicles via the second communication interface.

4. The system of claim 3, wherein the user interface is configured for specifically receiving a selection from the user selecting the at least one of the autonomous vehicles that is inhibited out of the subset of autonomous vehicles identified by the user interface based on a distance of the autonomous vehicles with respect to the second position of the portable device.

5. The system of claim 1, wherein at least one of the second position of the portable device, the first position of each autonomous vehicle on the mine site, and a state of at least one out of the plurality of autonomous vehicles are communicated to the centralized platform via the first communication interface.

6. The system of claim 1, wherein the corresponding second communication interface is configured to exchange data on at least one of a position and a heading directly between at least two of the plurality of autonomous vehicles, and wherein the corresponding first communication interface and the corresponding second communication interface of each autonomous vehicle use different hardware for communication.

7. A system for controlling a plurality of autonomous vehicles on a mine site, the system comprising:
 a centralized platform comprising a processor and memory storing an inventory list of the plurality of autonomous vehicles travelling on the mine site and configured to communicate missions to the plurality of autonomous vehicles;
 the plurality of autonomous vehicles, each autonomous vehicle comprising:
  a first transmitter configured to wirelessly communicate with the centralized platform for receiving a predetermined mission,
  a vehicle controller comprising a processor and memory configured to autonomously control the autonomous vehicle according to the predetermined mission; and
 a portable device comprising:
  a second transmitter configured to wirelessly communicate with at least one of the centralized platform and the plurality of autonomous vehicles,
  a user interface comprising a display and configured for identifying at least a subset of autonomous vehicles of the plurality of autonomous vehicles on the display for selection, wherein the subset of autonomous vehicles is determined based on a distance with respect to the portable device, the user interface being further configured for specifically receiving a selection from a user selecting an autonomous vehicle out of the subset of autonomous vehicles identified on the display for selection and for receiving an input from the user of an inhibit command for at least one of inhibiting and stopping motion of the selected autonomous vehicle, and
  a pairing function for pairing and unpairing the portable device to the system, wherein the centralized platform monitors connection to all portable devices paired to the system and initiates a global emergency stop if a connection to any portable device is lost for a predetermined time, the global emergency stop configured to inhibit motion of all vehicles out of the plurality of autonomous vehicles.

8. The system of claim 7, wherein the user interface is configured for displaying the subset of autonomous vehicles in an order depending on a distance of each autonomous vehicle of the subset of autonomous vehicles to the portable device and/or graphically showing a positon of each autonomous vehicle of the subset of autonomous vehicles with respect to the portable device.

9. The system of claim 7, wherein the user interface is configured for receiving an input from the user of a release command for releasing the inhibit command, wherein each vehicle controller is configured for turning that autonomous vehicle into an inhibit state by deactivating propulsion of that autonomous vehicle after receiving the inhibit command from the portable device, and wherein, in a case that the vehicle controller is switched off in an active inhibit state and switched on again, that autonomous vehicle will retain the active inhibit state until the inhibit command is released by the portable device.

10. The system of claim 7, wherein the user interface is configured for receiving an input from the user of a release command for releasing the inhibit command, wherein the system comprises a plurality of portable devices, and wherein, when a vehicle out of the plurality of autonomous vehicles is inhibited by inhibit commands received from at least two of the plurality of portable devices, the vehicle is only released after all inhibit commands have been released.

11. The system of claim 7, wherein the portable device comprises:
 an inertial measurement unit for determining at least one of inactivity of personnel carrying the portable device and the portable device having been dropped by personnel carrying the portable device.

12. The system of claim 7, wherein the inhibit command is sent directly from the portable device to the at least one of the autonomous vehicles, and wherein each first transmitter is part of a first communication interface and each autonomous vehicle further comprises a second communication interface for communicating with the second transmitter of the portable device to receive the inhibit command.

13. The system of claim 7, wherein the portable device further comprises a push button that, when activated by a first user input, causes the portable device to send a first command for activating a local emergency response inhibiting motion of all vehicles out of the plurality of autonomous vehicles present within a predetermined distance from the portable device.

14. The system of claim 13, wherein a second user input to the push button of the portable device causes the portable device to send a second command for activating the global emergency stop, and wherein activation of the global emergency stop on the portable device is only possible after activation of the local emergency stop on the portable device.

15. The system of claim 7, further comprising a personnel location tag configured to constantly inhibit motion of all vehicles out of the plurality of autonomous vehicles present within a predetermined distance from the personnel location tag and/or configured to make a location of the personnel location tag visible to the centralized platform.

16. A method for a portable device configured to communicate with a plurality of autonomous vehicles on a mine site, the method comprising:
 displaying, on a user interface including a display of the portable device, an indication of one or more autonomous vehicles of the plurality of autonomous vehicles that are within a predefined distance from the portable device;
 responsive to a user input selecting an autonomous vehicle of the one or more autonomous vehicles indicated on the user interface, sending an inhibit command from the portable device to only the selected autonomous vehicle, the inhibit command configured to inhibit and/or stop motion of the selected autonomous vehicle;

pairing and unpairing the portable device to a centralized platform;

monitoring connection to the portable device when paired to the centralized platform; and initiating an emergency action if the connection to the portable device is lost for a predetermined time.

17. The method of claim 16, wherein the selected autonomous vehicle includes a trajectory control system configured to autonomously control the selected autonomous vehicle according to a mission received from the centralized platform, and wherein the inhibit command is configured to inhibit and/or stop motion of the selected autonomous vehicle dictated by the mission.

18. The method of claim 17, wherein the inhibit command is sent directly from the portable device to the selected autonomous vehicle via a communication interface between the portable device at the selected autonomous vehicle.

19. A portable device for controlling a plurality of autonomous vehicles on a mine site, the portable device comprising:

a push button;

a local emergency stop function that, when activated, causes the portable device to send a first command inhibiting motion of all vehicles out of the plurality of autonomous vehicles present within a predetermined distance from the portable device, and wherein the local emergency stop function is activated by a first user input to the push button on the portable device, and a global emergency stop function that, when activated, causes the portable device to send a second command for inhibiting motion of all vehicles out of the plurality of autonomous vehicles, and wherein the global emergency stop function is activated by a second user input to the push button, wherein the push-button has a first and a second stage, and wherein the local emergency stop function is activated by pushing the push-button to the first stage and the global emergency stop function is activated by pushing the push-button through the first stage to the second stage.

20. The portable device of claim 19, further comprising:

a communication interface comprising a communication controller, amplifier, antenna, and/or V2V transmitter configured to wirelessly communicate directly with a communication interface of an autonomous vehicle of the plurality of autonomous vehicles, wherein the portable device is configured to receive position information on a first position of the autonomous vehicle from the autonomous vehicle via the communication interface, wherein the portable device further comprises a location system and a user interface, the location system comprising a receiver, gyroscope, and/or acceleration sensor and being configured to determine a second position of the at least one portable device, and the user interface comprising a display and being configured for displaying information identifying at least a subset of autonomous vehicles out of the plurality of autonomous vehicles based on the first position received via the communication interface, the subset of autonomous vehicles being determined based on a distance with respect to the second position of the portable device, and wherein the user interface is further configured for specifically receiving a selection from a user selecting an autonomous vehicle out of the subset of autonomous vehicles identified on the display for selection and for receiving an input from the user of an inhibit command for at least one of inhibiting and stopping motion of the selected autonomous vehicle.

* * * * *